(12) United States Patent
van Os

(10) Patent No.: US 8,004,496 B2
(45) Date of Patent: Aug. 23, 2011

(54) USER INTERFACE FOR ELECTRONIC DEVICES FOR CONTROLLING THE DISPLAYING OF LONG SORTED LISTS

(75) Inventor: Marcel van Os, San Francisco, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1308 days.

(21) Appl. No.: 10/127,855

(22) Filed: Apr. 22, 2002

(65) Prior Publication Data

US 2003/0128192 A1 Jul. 10, 2003

Related U.S. Application Data

(60) Provisional application No. 60/347,314, filed on Jan. 8, 2002.

(51) Int. Cl.
*G09G 5/00* (2006.01)
(52) U.S. Cl. .................................... 345/173; 178/18.01
(58) Field of Classification Search ................. 345/684, 345/973, 204, 184, 173, 163, 156, 661, 667, 345/668; 715/815, 828, 830; 178/18.01
See application file for complete search history.

(56) References Cited

U.S. PATENT DOCUMENTS

| | | | |
|---|---|---|---|
| 5,241,308 A | 8/1993 | Young | |
| 5,677,949 A * | 10/1997 | Macor | 379/354 |
| 5,786,819 A | 7/1998 | Weiser | |
| 5,936,618 A * | 8/1999 | Spiero et al. | 345/204 |
| 6,288,718 B1 * | 9/2001 | Laursen et al. | 715/800 |
| 6,300,967 B1 * | 10/2001 | Wagner et al. | 715/784 |
| 6,337,694 B1 * | 1/2002 | Becker et al. | 345/684 |
| 6,362,814 B1 * | 3/2002 | Aizawa | 345/169 |
| 6,459,424 B1 * | 10/2002 | Resman | 345/173 |
| 6,700,564 B2 * | 3/2004 | McLoone et al. | 345/156 |
| 6,724,366 B2 * | 4/2004 | Crawford | 345/157 |

FOREIGN PATENT DOCUMENTS

| | | |
|---|---|---|
| JP | 10063467 A | 3/1998 |
| JP | 2001168865 A | 6/2001 |

* cited by examiner

*Primary Examiner* — Abbas Abdulselam

(57) ABSTRACT

In a user-interface application, a computing apparatus has a user-interface to assist the user in searching for information from a data array. In an example embodiment according to the present invention, the data array is an ordered list of addresses. In a UI so equipped, the user experiences a particular sequence of events. The user begins at a point on a list of addresses. After the user rotates a jog/shuttle knob, the list rolls down a low rate. As the user rotates the jog/shuttle knob further the scroll accelerates. After a predetermined time or number of items, a helper character is displayed. This character may represent a first letter of a name or a first digit of a telephone number. The UI displays the helper character to the user. The user continues to hold the position of the jog/shuttle knob until a help character, corresponding to his/her desired selection, appears. The user releases the jog/shuttle knob and may step through among a smaller group of data to locate the particular selection by incrementally rotating the knob from the neutral position.

10 Claims, 3 Drawing Sheets

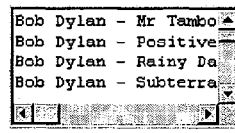

User starts at some point in the list

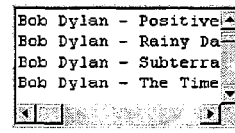

Scrolling starts off slow (one line per second)

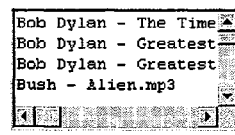

But soon speeds, so it is difficult to read the entries as they pass by

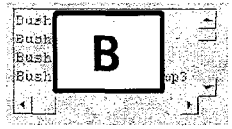

Large "helper" letter replaces list

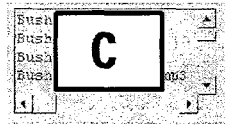

This now increments at a rate of approximately 1/second...

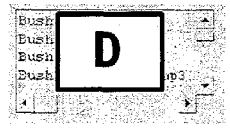

as long as the user holds down the scroll button

When the user reaches the vicinity of interest they release the scroll button

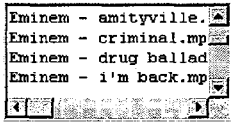

The list of entries returns to the screen

FIG. 2

USER INTERFACE FOR ELECTRONIC DEVICES FOR CONTROLLING THE DISPLAYING OF LONG SORTED LISTS

PRIORITY OF EARLIER APPLICATION

This application claims the benefit of Provisional Application 60/347,314 filed on Jan. 8, 2002 which is hereby incorporated by reference.

FIELD OF THE INVENTION

The present invention is generally directed to electronic devices and their user-interfaces. In particular, the present invention relates to a user-interface suitable for portable electronic devices.

BACKGROUND OF INVENTION

The increasing functionality of electronic devices provides the user more convenience in adapting a piece of gear to his or her specific requirements. With the increasing number of features available in a piece of gear there has not been a concomitant increase of the gear's size. Technology has made it possible to pack many transistors in the underlying circuits that make up the gear. For example, computing capability that once required a space on a tabletop now fits in the palm of one's hand. Similar trends are exhibited in audio/visual equipment, wireless telephones, diagnostic medical equipment and the like. Consequently, the user-interface is scaled-down with the size of the equipment.

Although one can miniaturize the equipment, a challenge exists to enable the user to easily interact with such equipment and yet maintain features. Human physiology sets limits as to how small a piece of equipment may be made and yet still be sufficiently convenient and enjoyable to use. Attributes found on larger gear, for example a laptop computer and its keyboard and display, provide high functionality and ease of use. The keyboard accommodates the hands and the display is large enough to be easy to read. However, such attributes may have to be sacrificed in going smaller. However, the sacrifice cannot be so great as to render the miniaturized gear too bothersome and too limited in capability

SUMMARY OF THE INVENTION

In many pieces of gear, the user interface prominently features a spring-loaded control knob. For example, in a video cassette recorder (VCR) the tape may be moved forward or backward by the user turning a knob clockwise or counter-clockwise a predetermined number of degrees. Twisting the knob to the extreme clockwise or counter-clockwise rotation causes the tape to either fast-forward or fast-rewind. Turning the same knob an incremental amount allows the tape to advance in a step-wise manner typically advancing frame-by-frame. The knob in a neutral position, not turned in opposition to a spring force, results in the tape being in a freeze-frame.

Thus, on a tape, the user may conveniently fast forward through unwanted information or pause to view the desired scenes. However, as one fast-forwards the tape he must cross through the unwanted information (i.e., the tape must pass over the VCR's playback heads), for the medium is serial. The information observed is literal. He cannot go to one piece of information without passing another along the way.

Media in which one can randomly access data does not have the above limitation. Such random access media include, but not limited, disk drives and memory. Such disk drives may be optical or magnetic. Memory may include random access memory (RAM), read only memory (ROM), programmable ROM, dynamic RAM, static RAM, and variations of these. One does not have to pass through the unwanted information. A representation of the stored data is usually placed in an index. Thus, one scrolls through the index to find the literal location on the medium for the desired information.

Such storage may exist for the user locally or be available on equipment coupled via a wired or wireless network. Consequently, application of a spring-loaded control knob (or a representation thereof) may be applied to obtaining access to information stored in random access media.

There exists a need to provide a user-interface (UI) that maintains functionality and ease of use while keeping the size of the screen and number of controls for the interface small. A consumer electronics device may have a small screen to indicate to the user which functions are available or have been used. The small screen is often a digital display of limited bit-depth. Consequently, it is not possible to render large amounts of data on the screen and have it be readable as it is on a large laptop computer display. Also it is impractical to employ the same keyboard interfaces that are used with a laptop computer. Multiple functionality has to be built into the UI so that it may keep the consumer electronics device small and light enough to fit into the user's hand.

On a piece of consumer electronics gear according to the present invention, the searching and viewing of data of long lists the scrolling through a large ordered list may be facilitated by the UI having a force-sensitive interface that provides tactile feedback (resistance) to the user in proportion to the displacement applied. The displacement applied may be any linear, rotational, compressive, tensile force applied. Such a control may comprise a spring-loaded jog/shuttle knob. The knob may also be emulated on a display device. The scrolling speed is determined by how many degree the knob is rotated. The direction of the scrolling is determined by whether the knob is rotated clockwise or counter-clockwise. Other devices similar to the jog-shuttle knob may include joysticks and spring-loaded scroll wheels. Additionally, pressure-sensitive devices such as touch pads on laptop PCs or drawing tablets may enable the user to scroll through a large list. The speed of the scrolling is for example, proportional to the pressure applied. The present invention is exemplified in a number of implementations, a number of which are summarized below. Thus, the invention contributes to user-friendliness of information management and retrieval systems based on ordered lists.

In one embodiment according to the present invention, a consumer electronics device comprises an information rendering device and a force-sensitive interface. The force-sensitive interface is operative to enable a user to scroll through an order list on the information-rendering device. A feature of this embodiment is that the jog/shuttle control is coupled to a user-interface. The user interface is an array scroller responsive to user actuation of the force-sensitive interface, the user actuation being a magnitude of force applied to the force-sensitive interface; a scrolling speed of the array scroller is controlled by the magnitude of the force applied. A helper character generator is actuated by continued user actuation of the array scroller. The helper character generator is operative to render a helper indication representative of a portion of the list being scrolled.

In another embodiment according to the present invention, in a data processing environment, there is a method for enabling a user to scroll through an ordered list in a data array accessible through a data processing device. The method comprises enabling the user to scroll through the list at a predetermined rate, in response to the user actuating the data processing device via a force-sensitive interface. The predetermined rate is proportional to the magnitude of the force the user exerts on the force-sensitive interface. A helper character representative of a portion of the list being scrolled is generated.

The above summaries of the present invention are not intended to represent each disclosed embodiment, or every aspect, of the present invention. Other aspects and example embodiments are provided in the figures and the detailed description that follows

BRIEF DESCRIPTION OF THE DRAWINGS

The invention may be more completely understood in consideration of the following detailed description of various embodiments of the invention in connection with the accompanying drawings, in which:

FIG. 2 depicts the process of FIG. 1 as applied to an example user-interface.

Figure 1:
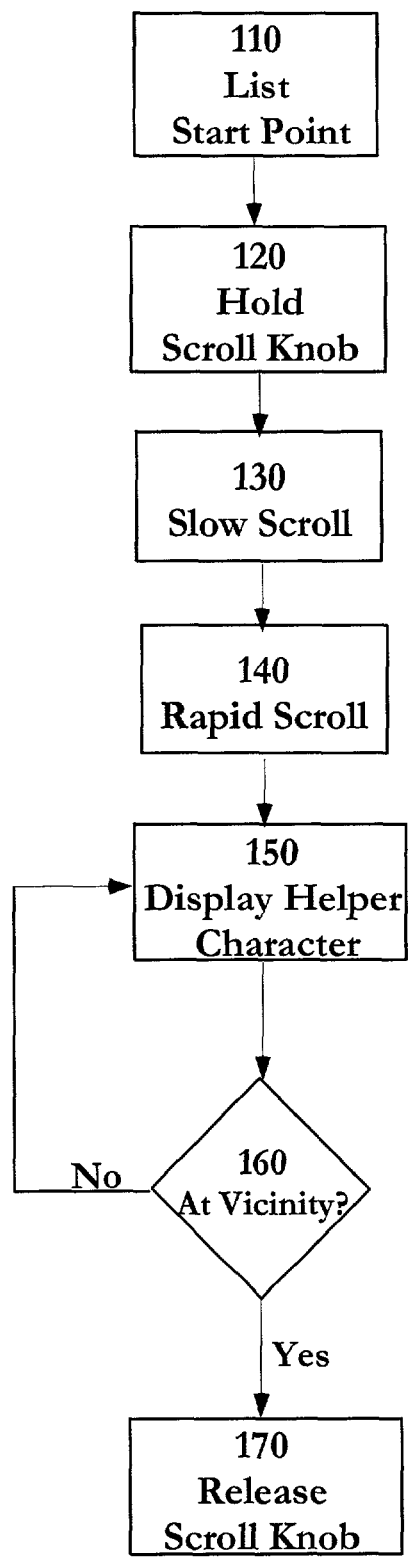
FIG. 1 outlines the process of selecting an item on a list according to an embodiment of the present invention.

While the invention is susceptible to various modifications and alternative forms, specific embodiments thereof have been shown by way of example in the drawings and will herein be described in detail.

DETAILED DESCRIPTION

The present invention has been found to be useful and advantageous in connection with increasing the efficiency and ease-of-use in a device, application, or service built with and designed to utilize minimal computing resources. This may include small displays found on, e.g., personal digital assistants (PDAs), telephone handsets, MP3 players, global positioning receivers (GPS), and automobile dashboard displays. Space constraints of these devices may limit the number of buttons and their functionality to control these small displays. This may also include network services of a distributed computing environment such as the World Wide Web. The maximizing of efficiency by using the invention provides the user more convenience in reducing bandwidth requirements of the network in searching for and retrieving of information. Moving less data back and forth across the network saves time. Further information about graphical user interfaces (GUI) employed by the aforementioned devices may be found in a patent application titled, "Hand-Held with Auto-Zoom for Graphical Display of Web Page, Ser. No. 09/619,426 filed Jul. 19, 2000, incorporated by reference in its entirety herein.

Further information about a GUI that enables the user to negotiate data from a long sorted list may be found in a patent application titled, "Rapid Retrieval User Interface Designed Around Small Displays and Few Buttons for Searching Long Sorted Lists," Ser. No. 09/780,229 filed Feb. 9, 2001, incorporated by reference in its entirety herein.

Within the context of the invention, a user selects an item from an ordered list, such as a file list from a computer, a name from a telephone directory, or a town name from a database. In an example application, the user is typically presented with a scrollable list on the display, with the ability to scroll the list and the ability to select an item on the list.

The ability to scroll through a large ordered list may be facilitated by the UI having a control that provides a tactile resistance to the user e.g., in proportion to the displacement applied. Such a control may comprise a spring-loaded jog/shuttle knob. The scrolling speed is determined by how many degrees the knob is rotated. The direction of the scrolling is determined by whether the knob is rotated clockwise or counter-clockwise. Other devices similar to the job-shuttle knob may include joysticks and scroll wheels. Additionally, pressure-sensitive devices such as touch pads on laptop PCs or drawing tablets may enable the user to scroll through a large list. The speed of the scrolling in proportional to the pressure applied.

When faced with a long list of items and a small display, it is often difficult to scroll through the list. If the screen is small, items do not stay on the screen for a very long time. Scrolling, therefore, needs to be done slowly, to allow the eye/brain to see the item for long enough to read it. On a large screen this is less of a problem, as the eye can track an item as it scrolls across the screen.

For a long list, it is desirable to scroll fast; otherwise the time taken to access the desired element in the list is annoyingly long. However, fast scrolling is in conflict with the previous point. The usability of a number of devices is constrained by the retrieval of data from a long list. For example, in a cellular phone (for the user's address book), these devices may have, or may have access to, address books hundreds of entries in length. Scrolling through the entries to select a number to dial is most desirable, as it can be done with just the thumb of one hand. In a PDA, databases such as the address book or other databases may be hundreds or thousands of entries in length. Also, portable audio jukeboxes—and MP3 players can now hold many tracks of music on an internal hard disk or solid state memory, but the unit itself is no larger than a traditional portable CD player. Typically as a cost and size saving the UI is via a display a few lines long and three or four buttons.

In a conventional UI, when the user starts to scroll through a long list, the scroll rate increases after a few seconds of holding down the scroll key. Entries in the list then scroll by at a rate that is almost impossible to read, particularly on a small screen In a UI according to an embodiment of the present invention, the user experiences a particular sequence of events. The user begins at some point on a list. After the user rotates the jog/shuttle dial, the list rolls down at a low rate. As the user applies more force (i.e, rotates the jog/shuttle dial more) the scroll accelerates. After a predetermined time (e.g., about a second), a helper character is displayed. This character may represent a first letter of a name or a first digit of a telephone number. The character displayed is representative of a cluster of entries in the ordered list at the position currently being scrolled over. The UI displays the helper character to the user. The user continues to hold the scroll button until a help character, corresponding to his/her desired selection, appears. The user releases the scroll button and may slowly browse among a smaller group of data to locate the particular selection.

Refer to FIG. 1. The process, according to the present invention, is outlined. The procedure 100 begins at a list start point 110. The search is begun when the user rotates the knob 120 slightly The UI does a slow scroll 130. If the scroll 130 is too slow, the user may rotate the knob 120 further. A helper character is displayed 150. The helper character 150 represents the cluster of data currently being scrolled over. The user observes the display until the helper character displayed is in the vicinity 160 of the data he/she desires; that is, the helper character indicates the cluster sought. Having found the desired data, the user releases the knob 170. The knob springs back to its neutral position thus assisting the user in arresting the scrolling quickly. The list either scrolls forward or backward depending upon whether the knob 120 is rotated clockwise or counter-clockwise.

In another embodiment according to the present invention, such a scrolling procedure 100 may also be performed using a pressure-sensitive device such as a touch pad. The scroll moves in proportion to the force exerted by the user's finger or stylus. Forward or backward motion of the scroll may be defined by selected areas on the touch pad.

Refer to FIG. 2. In an example screen UI 200, the user starts at a point in an alphabetically ordered list 210 whose entries begin with the letter "B." The user is interested in viewing an entry whose name begins with the letter "E." The user rotates the knob; the list starts to step down at a low rate. Scrolling starts off slowly at the rate of about one line per second in step 220.

If desired, the knob is rotated further and the scrolling speeds up in step 230. After a predetermined time ($T_1$) or number of items, the screen area for the scrolling list is replaced by a single large character representing the first character of the cluster of items currently displayed in the window (or on the first line of the window for a window that has multiple lines). It is difficult to read the entries as they pass; a large "helper" letter ("B") 240 supersedes above the list. In another embodiment, the "helper" letter may appear to the right or left (top or bottom) of the scrolled list and not cover the entire screen area.

After some time ($T_2$) or number of items, the character increments to the next possible value, as long as the user is holding down the scroll key. For example, in an alphabetically sorted list of names, the user might have started scrolling from "C", after holding the key down for 3 seconds, stepping slowly through the entries starting with "C", the list of discrete entries is replaced by a large "C" which overlaps the whole UI. As long as the user continues to maintain orientation of the knob, the letter will change, at about one second intervals to "D", then "E", etc The list goes through the alphabet, as depicted by helper letters "C" 241, "D" 242, and "E" 243. The user releases the scroll button, having reached the vicinity of interest in step 244, upon viewing the helper letter "E" 243. When the user finally releases the knob, the entry in the list "closest" to the helper letter (or letters) is selected and displayed as the first item in the scroll list window in the UI screen 200.

In another example embodiment, the character displayed on the screen during the fast scroll does not necessarily need to be tied to the entries in the list being scrolled. For instance, the list may contain an alphabetically sorted list of names, with no entries for "L" and "M", but that does not mean that the fast scroll mechanism needs to skip those letters during its operation. There are advantages in doing this. The list need not be traversed to retrieve entries for each increment, hence saving processing time. The user is not "caught-out" by the list suddenly jumping from "K" to "N".

An example embodiment may also incorporate "decelerating" the scroll. If the user releases the knob momentarily during the "fast scroll", but re-rotates the knob before a certain time elapses ($T_3$), the scroll continues. The spring-loaded knob also provides for a rapid stop of the scrolling data so that the user does not overshoot his desired selection. The neutral position is defined as "stop." Rather than the single character being displayed incrementing on screen at the $T_2$ rate, a second letter appears alongside the first and that would increment instead. For example, the display would increment as "EA," "EB," "EC." This of course can be extended to a third and four letters, as appropriate for a given application. Each subsequent short release of the scroll knob adds an additional letter to the display. The helper display encompasses a smaller subset of scrolling data. This short-release of the knob may be described as momentarily releasing the knob so that it springs back to the neutral position, then re-rotating it (at a predetermined angle) to continue the scrolling. Again, as mentioned earlier, the helper characters may be displayed along the side of the scrolled list.

As explained above with respect to some examples, aspects of the invention reside in providing an ergonomic user-interface for finding a specific information item in an ordered list or array. While scrolling through the list or array, the representations of the individual items get blurred and cannot be recognized anymore. An aspect of the invention addresses the issue of displaying a meta item that is representative of a group of items that is currently being scrolled.

The ergonomic user-interface may also include not only graphical, visually oriented user-feedback of the helper character but may include aurally oriented audio feedback or touch-oriented tactile feedback. For example, one who is blind may be able to use such an equipped device to listen to the helper character or feel a Braille representation thereof. Further information on an audio interface U.S. patent application Ser. No. 09/464,855 filed on Dec. 16, 1999, titled, "Hand-Ear Interface for Handheld Device," incorporated by reference herein its entirety.

Figure 3:
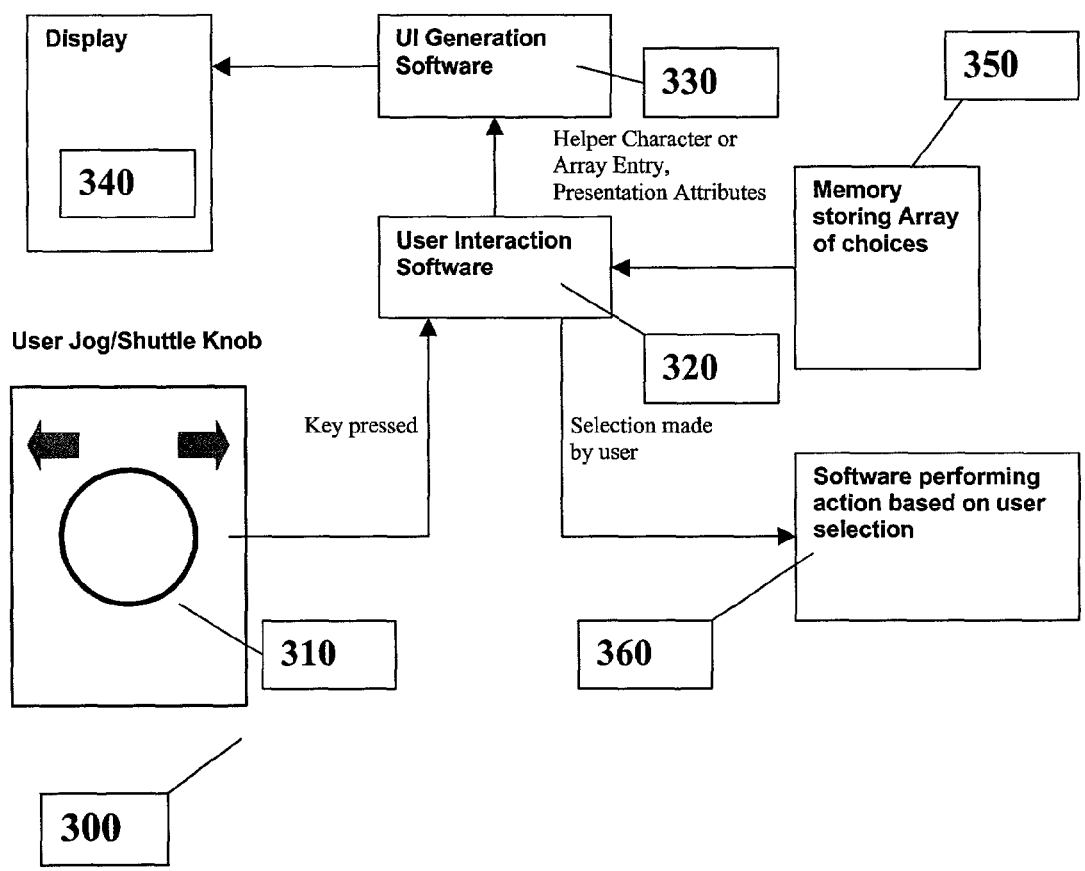
FIG. 3 depicts an example embodiment according to the present invention as is implemented in a handheld device.

The invention may be implemented on a handheld device in an example embodiment according to the present invention. Refer to FIG. 3. As depicted in a block diagram, a handheld device 300 comprises an actuator 310 and a display 340. The user interface may be a spring loaded jog/shuttle dial, joystick, or track pad. The user may actuate the actuator 310 to scroll either up or down. User interaction software 320 works in response to the selected key and the array of choices stored in memory 350. In the example handheld device, the memory 350 may have addresses and phone numbers. The user interaction software 320 provides output to software performing an action based on the user selection 360 and to user interface generation software 330. The UI generation software 330 generates information for the display 340 to depict the helper character or array entry along with presentation attributes such a font style, size, color, and object placement.

In an example embodiment according to the present invention, the jog/shuttle may be part of a handheld device that controls a set top box (STB). The STB, in turn, is connected to a network and it is enabled to receive program content from that network. The connection may be through a cable or via a satellite dish. The STB may store a super set of program information for the user. A subset of information may be transmitted to the handheld device and stored locally on it. This subset may be the user's favorite programs or URLs on the Internet. Information may be found that is directed toward the obtaining of content information as it relates to a method of selecting content through a network via a Uniform Resource Locator (URL), in a U.S. patent application titled, "One-Touch URL or Program Selection," of Thomas Dubil et al, Ser. No. 09/872,715 filed Jun. 1, 2001 and is incorporated by reference, herein.

The user may scroll through the subset of data on the handheld, after having downloaded from the STB.

While the present invention has been described with reference to several particular example embodiments, those skilled in the art will recognize that many changes may be made thereto without departing from the spirit and scope of the present invention, which is set forth in the following claims.

What is claimed is:

1. A consumer electronics device comprising:
   an information-rendering device;
   a force-sensitive interface, operative to enable a user to scroll through an ordered list of a data array that is rendered on the information rendering device; and
   a helper character-generator being operative to replace a portion of an item in the list being scrolled, with an enlarged rendered helper character.

2. The device of claim 1 wherein the information-rendering device is selected from at least one of the following: visual display, audio output, tactile feedback.

3. The device of claim 1 wherein the force-sensitive interface is coupled to a user interface assisting in searching for information from an ordered list in a data array, the user interface comprising,
   an array scroller responsive to user actuation of the force-sensitive interface, the user actuation being a magnitude of a force applied to the force-sensitive interface, a scrolling speed of the array scroller being controlled by the magnitude of the force applied; and
   the helper character-generator, actuated by continued user actuation of the array scroller, the helper character generator being operative to render an initial character of an item in the list being scrolled, in a enlarged manner on a whole or a part of a screen of a visual display of the rendering device after being scrolled a predetermined time or a predetermined number of items.

4. The device of claim 1 wherein, the helper character generator conditionally renders a record of additional helper characters in addition to the initial character.

5. In a data processing environment, a method for enabling a user to scroll through an ordered list in a data array accessible through a data processing device, the method comprising:
   enabling the user to scroll through the list at a predetermined rate, in response to the user actuating the data processing device via a force-sensitive interface, the predetermined rate being controlled by the magnitude of force the user exerts on the force sensitive interface; and
   generating a portion of an item of the list being scrolled, in an enlarged manner.

6. The method of claim 5, wherein the data processing environment comprises a distributed environment.

7. The method of claim 6, wherein the force-sensitive interface comprises at least one of the following: jog/shuttle dial, touch pad, drawing tablet, mouse scroll wheel, joystick.

8. A consumer electronics device comprising:
   a rendering device for rendering of an ordered list representing user-selectable items;
   a force-sensitive user-interface for control of a speed of scrolling through the list rendered on the rendering device; and
   a helper character-generator being operative to render a character in an enlarged manner replacing any prior such character that is representative of a portion of an item in the list being scrolled.

9. Software, stored on computer-readable non-transitory media, for enabling a user to scroll through an ordered list in a data array accessible through a data processing device, the software comprising:
   instructions for enabling the user to scroll through the list at a predetermined rate, in response to the user actuating the data processing device via a force-sensitive interface, the predetermined rate being controlled by the magnitude of force the user exerts on the force sensitive interface; and
   instructions for generating a helper character representative of a portion of the list being scrolled, wherein the helper character is generated in an enlarged manner relative to other items of the ordered list.

10. The software of claim 9 wherein the computer-readable non-transitory media comprises at least one of the following: semiconductor memory, optical storage, magnetic storage, client/server data storage.

* * * * *